United States Patent
Rangarajan et al.

(10) Patent No.: US 12,131,175 B2
(45) Date of Patent: Oct. 29, 2024

(54) MICROSERVICE HARDWARE AND SOFTWARE DEPLOYMENT

(71) Applicant: INTERNATIONAL BUSINESS MACHINES CORPORATION, Armonk, NY (US)

(72) Inventors: Arvind Rangarajan, Chennai (IN); Vijay Kumar Ananthapur Bache, Bangalore (IN); Srithar Rajan Thangaraj, Chennai (IN); Pradeep Raj Jayarathanasamy, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 573 days.

(21) Appl. No.: 17/406,258

(22) Filed: Aug. 19, 2021

(65) Prior Publication Data

US 2023/0059339 A1    Feb. 23, 2023

(51) Int. Cl.
| | |
|---|---|
| *G06F 9/455* | (2018.01) |
| *G06F 8/61* | (2018.01) |
| *G06N 20/00* | (2019.01) |

(52) U.S. Cl.
CPC ............ *G06F 9/45558* (2013.01); *G06F 8/61* (2013.01); *G06N 20/00* (2019.01); *G06F 2009/45562* (2013.01); *G06F 2009/45595* (2013.01)

(58) Field of Classification Search
CPC .................. G06F 9/45558; G06F 8/61; G06F 2009/45595; G06F 2009/45562; G06N 20/00
See application file for complete search history.

(56) References Cited

U.S. PATENT DOCUMENTS

| | | | |
|---|---|---|---|
| 11,080,032 B1 * | 8/2021 | O'Mahony | G06F 9/45533 |
| 2018/0039501 A1 * | 2/2018 | Jain | H04L 43/045 |
| 2019/0098068 A1 * | 3/2019 | Iliofotou | H04L 67/535 |

(Continued)

OTHER PUBLICATIONS

Bakker, Abu Ahmed; Circuit Breaker Design Pattern Using Netflix Hystrix; https://dzone.com/articles/circuit-breaker-design-pattern-using-netflix-hystr; Nov. 12, 2019; 13 pages.
Kubernetes Blog; Managing microservices with the Istio service mesh; https://kubernetes.io/blog/2017/05/managing-microservices-with-istio-service-mesh/; May 31, 2017; 7 pages.

(Continued)

*Primary Examiner* — Charles E Anya
(74) *Attorney, Agent, or Firm* — Schmeiser, Olsen & Watts, LLP; Edward Wixted (57) ABSTRACT

A system, method, and computer program product for implementing microservice deployment is provided. The method includes receiving definitions associated with microservices related to implementing hardware and software solutions with respect to hardware and software systems. In response, a definition file and associated code comprising the definitions and associated dependencies associated with the microservices are generated. The microservices are deployed to a container orchestration system cluster on a cloud structure and a service mesh and machine learning module are installed within the container orchestration system cluster. Proxies comprising a proxy for each pair of dependencies are generated and network traffic passing through each proxy is monitored. A malfunction of a hardware or software system is detected and an associated network route passing through an associated proxy is disabled.

18 Claims, 7 Drawing Sheets

(56) References Cited

U.S. PATENT DOCUMENTS

| | | |
|---|---|---|
| 2019/0222526 A1 | 7/2019 | Edwards |
| 2020/0133789 A1* | 4/2020 | Natanzon .............. G06F 16/128 |
| 2020/0133795 A1* | 4/2020 | Rhodes .............. G06F 11/1469 |
| 2020/0296172 A1 | 9/2020 | Gunjal |
| 2020/0358802 A1* | 11/2020 | Viswambharan ..... G06F 9/5072 |
| 2020/0366573 A1* | 11/2020 | White ................. G06F 9/45558 |
| 2021/0019194 A1* | 1/2021 | Bahl ................... H04L 67/1031 |
| 2021/0135982 A1* | 5/2021 | Chaturmohta .......... H04L 45/28 |
| 2022/0164186 A1* | 5/2022 | Pamidala .............. G06F 9/5088 |

OTHER PUBLICATIONS

Li, Wubin et al.; Service Mesh: Challenges, State of the Art, and Future Research Opportunities; 2019 IEEE International Conference on Service-Oriented System Engineering (SOSE); Apr. 9, 2019; 6 pages.

Mell, Peter et al.; "The NIST Definition of Cloud Computing;" National Institute of Standards and Technology; Special Publication 800-145; Sep. 2011; 7 pages.

Montesi, Fabrizio et al; Circuit Breakers, Discovery, and API Gateways in Microservices; arXiv:1609.05830v2; Sep. 21, 2016; 9 pages.

Tiwari, Abhishek; A sidecar for your service mesh; https://www.abhishek-tiwari.com/a-sidecar-for-your-service-mesh/; Jun. 24, 2017; 15 pages.

* cited by examiner

MICROSERVICE HARDWARE AND SOFTWARE DEPLOYMENT

BACKGROUND

The present invention relates generally to a method for deploying a microservice and in particular to a method and associated system for improving software container cluster technology associated with defining microservices related to implementing hardware and software solutions with respect to hardware and software systems; deploying the microservices to a container orchestration system cluster within a cloud; monitoring network traffic passing through a proxy; detecting a malfunction of a hardware or software system; and disabling an associated network route passing through the proxy.

SUMMARY

A first aspect of the invention provides server comprising a processor coupled to a computer-readable memory unit, the memory unit comprising instructions that when executed by the processor implements a microservice deployment method comprising: receiving, by the processor, definitions associated with microservices related to implementing hardware and software solutions with respect to hardware and software systems; generating, by the processor, a definition file and associated code comprising the definitions and associated dependencies associated with the microservices; deploying, by the processor executing the code with respect to the definition file, the microservices to a container orchestration system cluster on a cloud structure; installing, by the processor, a service mesh of the server and a machine learning module within the container orchestration system cluster; generating, by the processor executing the machine learning module, a plurality of proxies comprising a proxy for each pair of dependencies of the associated dependencies and an associated backup structure; monitoring, by the processor executing the machine learning module, network traffic passing through each the proxy; detecting, by the processor based on results of the monitoring, a malfunction of at least one hardware or software system of the software hardware and software systems; and disabling, by the processor in response to results of the detecting, an associated network route passing through an associated proxy of the plurality of proxies.

A second aspect of the invention provides a microservice deployment method comprising: receiving, by a processor of a server, definitions associated with microservices related to implementing hardware and software solutions with respect to hardware and software systems; generating, by the processor, a definition file and associated code comprising the definitions and associated dependencies associated with the microservices; deploying, by the processor executing the code with respect to the definition file, the microservices to a container orchestration system cluster on a cloud structure; installing, by the processor, a service mesh of the server and a machine learning module within the container orchestration system cluster; generating, by the processor executing the machine learning module, a plurality of proxies comprising a proxy for each pair of dependencies of the associated dependencies and an associated backup structure; monitoring, by the processor executing the machine learning module, network traffic passing through each the proxy; detecting, by the processor based on results of the monitoring, a malfunction of a at least one hardware or software system of the software hardware and software systems; and disabling, by the processor in response to results of the detecting, an associated network route passing through an associated proxy of the plurality of proxies.

A third aspect of the invention provides a computer program product, comprising a computer readable hardware storage device storing a computer readable program code, the computer readable program code comprising an algorithm that when executed by a processor of a server implements a microservice deployment method, the method comprising: receiving, by the processor of a server, definitions associated with microservices related to implementing hardware and software solutions with respect to hardware and software systems; generating, by the processor, a definition file and associated code comprising the definitions and associated dependencies associated with the microservices; deploying, by the processor executing the code with respect to the definition file, the microservices to a container orchestration system cluster on a cloud structure; installing, by the processor, a service mesh of the server and a machine learning module within the container orchestration system cluster; generating, by the processor executing the machine learning module, a plurality of proxies comprising a proxy for each pair of dependencies of the associated dependencies and an associated backup structure; monitoring, by the processor executing the machine learning module, network traffic passing through each the proxy; detecting, by the processor based on results of the monitoring, a malfunction of at least one hardware or software system of the software hardware and software systems; and disabling, by the processor in response to results of the detecting, an associated network route passing through an associated proxy of the plurality of proxies.

The present invention advantageously provides a simple method and associated system capable of automating microservice deployment.

DETAILED DESCRIPTION

Figure 1:
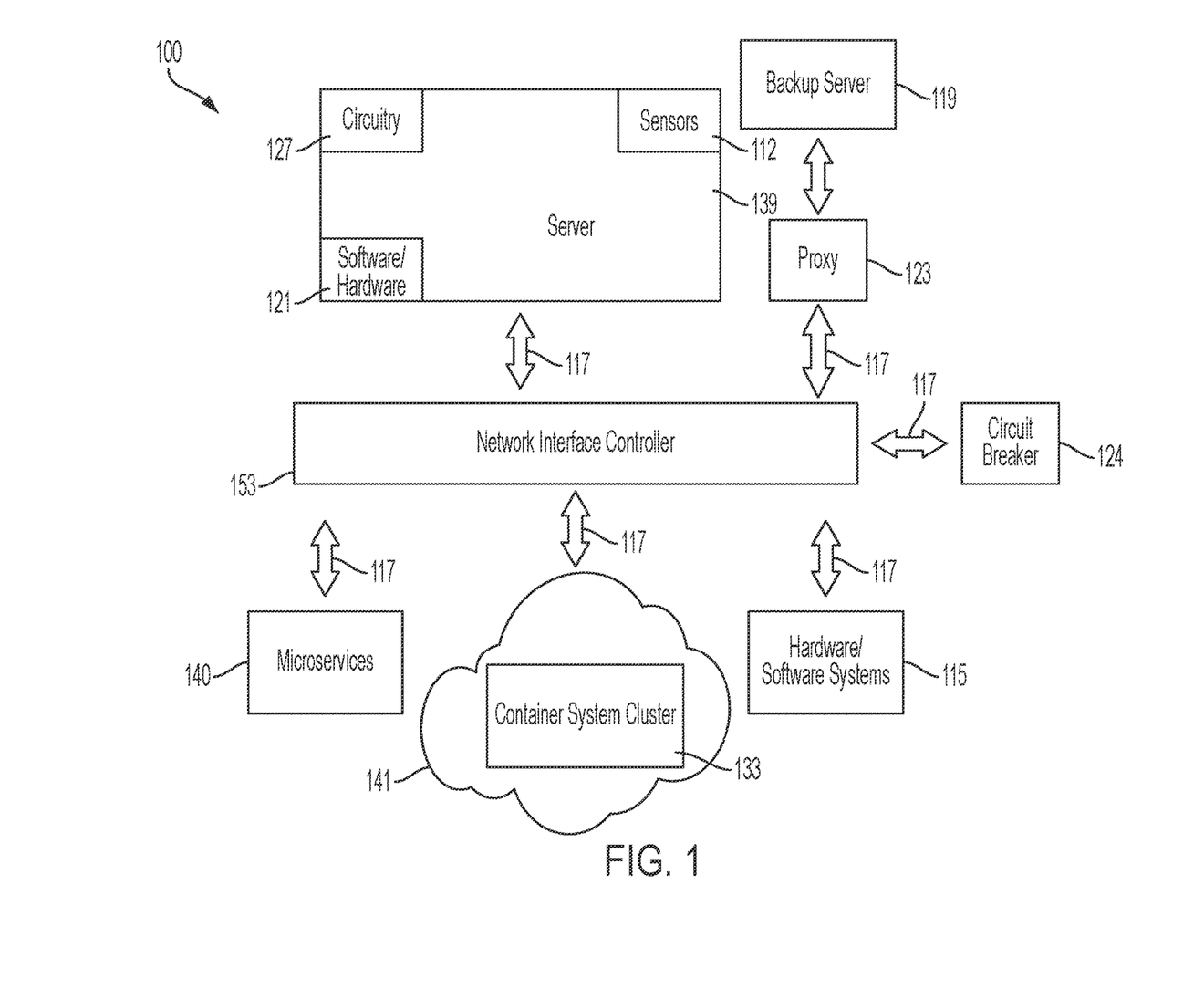
FIG. 1 illustrates a system for improving software container cluster technology associated with defining microservices related to implementing hardware and software solutions with respect to hardware and software systems; deploying the microservices to a container orchestration system cluster within a cloud; monitoring network traffic passing through a proxy; detecting a malfunction of a hardware or software system; and disabling an associated network route passing through the proxy, in accordance with embodiments of the present invention.

FIG. 1 illustrates a system 100 for improving software container cluster technology associated with defining microservices related to implementing hardware and software solutions with respect to hardware and software systems; deploying the microservices to a container orchestration system cluster within a cloud; monitoring network traffic passing through a proxy; detecting a malfunction of a hardware or software system; and disabling an associated network route passing through the proxy, in accordance with embodiments of the present invention. Typical application development systems may enable microservice based architectures for replacing monolithic architectures. Likewise, cloud and container technologies may enable microservices to be developed and deployed independently via separate team structures. Enterprises may adopt microservices with respect to large scale applications thereby enabling new frameworks (such as a service mesh) for microservice management and deployment. A service mesh may eliminate a need for developers to handle microservice discovery, communication, fault tolerance, and new release testing. Common service mesh frameworks (e.g., streaming services) may only be configured to operate with respect to a microservice plane and may not be configured to operate with external systems connected the microservices. For example, external systems may include, inter alia, include core banking systems, customer relationship management (CRM) systems etc. Therefore, if there is a disruption to only one of those systems, it may require a long time for fault to be identified and handled by a service mesh and circuit breaker as the circuit breaker only monitors microservice endpoints thereby incorrectly determining that the fault is located at the service. Disadvantages of the aforementioned setup may include:

1. Usage of developers for handling external services/systems of record disruptions thereby causing large scale microservices development to allocate a large number of development hours since error handling is repeated across all of the different microservices.

2. Delays encountered (by an end user/requestor) with respect to responses due to timeouts for an extended period of time as a fault may be identified at each microservice level and associated shutdown. Therefore, there is a need for standard frameworks to handle faults on the external systems for better efficiency such that development and support teams may adopt a uniform fault tolerance mechanism.

System 100 is configured to improve and enhance service mesh efficiency with respect to microservices deployments (e.g., Kubernetes system associated with a pod comprising a group of one or more containers with shared storage and network) with external systems and services. A service mesh is defined herein as a dedicated infrastructure layer for facilitating service-to-service communications between services or microservices via proxy usage. Likewise, system 100 enables a service mesh to handle operational issues initiated from Kubernetes components and associated external systems. In addition to sidecars (i.e., a utility container in a pod that is loosely coupled to a main application container) that are employed by a service mesh for microservices, system 100 comprises a proxy (e.g., proxy 123) to each external system of record or cloud service. Likewise, system 100 is configured to monitor microservices and external systems or services and associated historical data and metrics and intelligently manage network routes to the microservices and the external systems. A circuit breaker may be configured to monitor error responses and timeouts from a specific microservice and shut down the communication after a specified number of connection tries. Subsequently, system 100 is configured to wait for a service to come back up to restore communication. Therefore, a service disruption is handled and a response is quickly transmitted back to a requestor.

System 100 is configured to simplify system error handling with external systems or services of a microservices solution via an extension of a service mesh framework. Likewise, system 100 is configured to enable an extension of microservices and Kubernetes constructs in combination with machine learning to greatly enhance service mesh circuit breaker operation in order to comprehensively monitor, reroute, or shutdown communication routes to external systems resulting in improved efficiency of a service mesh.

System 100 of FIG. 1 includes a server 139, a container system cluster 133 within a cloud system 141, microservices 140, hardware/software systems 115, a backup server 119, a proxy 123, a circuit breaker 124, and a network interface controller interconnected through a network 7. Server 139 comprises sensors 112, circuitry 127, and software/hardware 121. Container system cluster 133 within a cloud system 141 may comprise a Kubernetes system comprising an open-source container-orchestration system for automating computer application deployment, scaling, and management. Hardware/software systems 115 may comprise any type of hardware and/or software configured to provide operational support for server 139. Circuit breaker 124 comprises any type of hardware and/or software configured to disable communications between any type of hardware or software components. Server 139, container system cluster 133, and hardware/software systems 115 each may comprise an embedded device(s). An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, server 139, container system cluster 133, and hardware/software systems 115 may each comprise a specialized hardware device comprising specialized (non-generic) hardware and circuitry (i.e., specialized discrete non-generic analog, digital, and logic-based circuitry) for (independently or in combination) executing a process described with respect to FIGS. 1-6. The specialized discrete non-generic analog, digital, and logic-based circuitry (e.g., sensors 112, circuitry/logic 127, software/hardware 121, etc.) may include proprietary specially designed components (e.g., a specialized integrated circuit, such as for example an Application Specific Integrated Circuit (ASIC) designed for only implementing an automated process for improving software container cluster technology associated with defining microservices related to implementing hardware and software solutions with respect to hardware and software systems; deploying the microservices to a container orchestration system cluster within a cloud; monitoring network traffic passing through a proxy; detecting a malfunction of a hardware or software system; and disabling an associated network route passing through the proxy. Sensors 112 may include any type of internal or external sensors including, inter alia, GPS sensors, Bluetooth beaconing sensors, cellular telephone detection sensors, Wi-Fi positioning detection sensors, triangulation detection sensors, activity tracking sensors, a temperature sensor, an ultrasonic sensor, an optical sensor, a video retrieval device, humidity sensors, voltage sensors, network traffic sensors, etc. Network 7 may include any type of network including, inter alia, a local area network, (LAN), a wide area network (WAN), the Internet, a wireless network, etc.

System 100 is enabled to execute a process for adding external systems and services to dependencies within a microservice definition file. A service mesh is configured to read the dependency and create a proxy for each unique dependency. Likewise, the service mesh creates a route for corresponding microservices to communicate with each proxy and monitors responses from external systems or services through the proxy. Additionally, the service mesh monitors responses from sidecars with respect to microservices. The service mesh may additionally switch to an alternate system such as a disaster recovery system based on inputs from a meta language (ML) module. A ML module is configured to retrieve a number of inputs (or attributes) in order to determine routing rules for a service mesh and to provide inputs to a circuit breaker to disable or enable a communication route. Inputs may include, inter alia. A system of record (SoR) response time, historical SoR outages, historical load conditions, microservice throughput, worker node/container latency, a maintenance schedule, etc.

The following implementation example describes a microservices solution scenario associated with a banking hardware/software system:

A microservices solution associated with a service mesh is configured to connect to a core banking system such that two services (e.g., create account and transfer money) connect to a same system. Likewise, if the system undergoes any scheduled maintenance, a circuit breaker disables each instance of the create account and transfer money microservice after checking responses multiple times (independent of each other). Additionally, when the system is applied to a large scale microservice solution (e.g., comprising thousands of microservices interfacing with multiple external interfaces) the system may contribute to a bad end user experience. Therefore, the system comprises a circuit breaker to disable or reroute all communication connections to the system that are disrupted thereby enabling all microservices to respond quickly without timing out. Depending on an enterprise, a service mesh may also redirect requests to an alternate system temporarily. Current solutions require a custom health check solution coupled with a load balancer thereby creating a time consuming solution to develop and maintain.

The following implementation example describes a microservices solution scenario associated with a Weather application programming (API) system:

A related solution may be configured to handle complicated scenarios that previously required many development hours and may be difficult to handle in production. Therefore system 100 is configured to enable a microservices solution for retrieving data from a Weather API comprising a specified license limit and return an http error when a license limit is reached. A related microservices dependency file may specify an alternate API endpoint when a particular error code is received. Likewise, a service mesh may be dynamically configured to reroute API requests to an API stub once the license limit is reached. Current microservices code requires rewriting to handle such scenarios.

Figure 2:
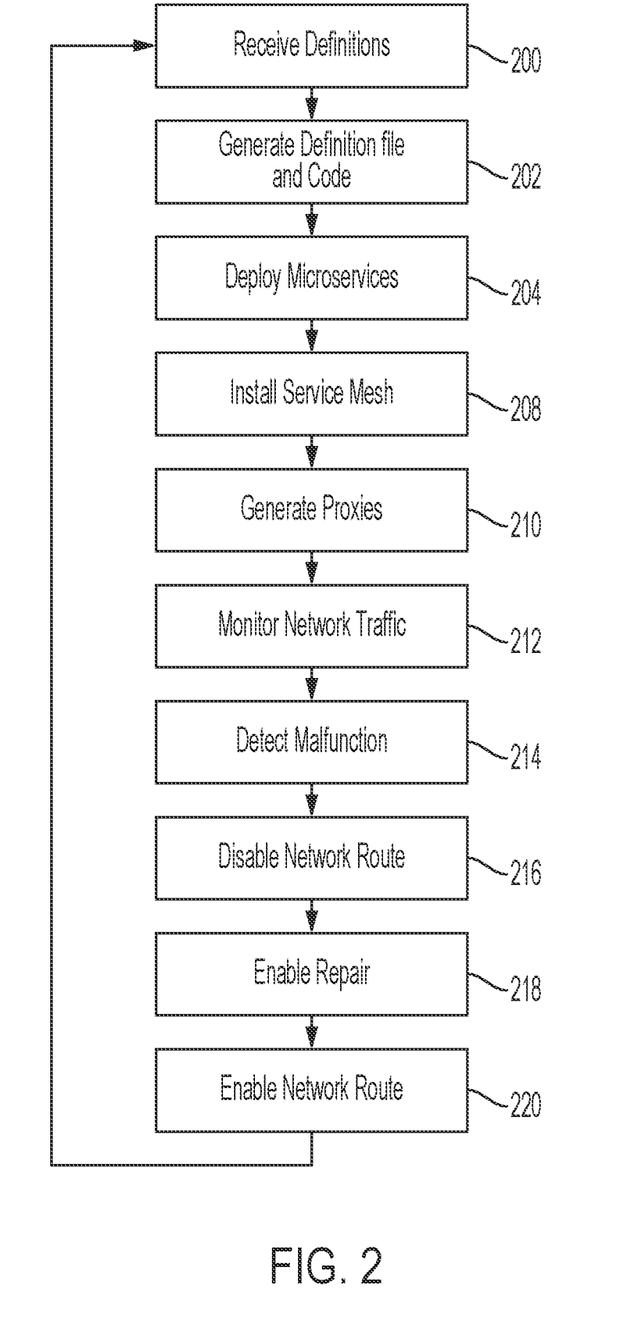
FIG. 2 illustrates an algorithm detailing a process flow enabled by the system of FIG. 1 for improving software container cluster technology associated with defining microservices related to implementing hardware and software solutions with respect to hardware and software systems; deploying the microservices to a container orchestration system cluster within a cloud; monitoring network traffic passing through a proxy; detecting a malfunction of a hardware or software system; and disabling an associated network route passing through the proxy, in accordance with embodiments of the present invention.

FIG. 2 illustrates an algorithm detailing a process flow enabled by system 100 of FIG. 1 for improving software container cluster technology associated with defining microservices related to implementing hardware and software solutions with respect to hardware and software systems; deploying the microservices to a container orchestration system cluster within a cloud; monitoring network traffic passing through a proxy; detecting a malfunction of a hardware or software system; and disabling an associated network route passing through the proxy, in accordance with embodiments of the present invention. Each of the steps in the algorithm of FIG. 2 may be enabled and executed in any order by a computer processor(s) executing computer code. Additionally, each of the steps in the algorithm of FIG. 2 may be enabled and executed in combination by edge server 139 and central server 140. In step 200, definitions are received by a server. The definitions are associated with microservices related to implementing hardware and software solutions with respect to hardware and software systems. In step 202, a definition file and associated code comprising the definitions and associated dependencies associated with the microservices are generated. In step 204, the microservices are deployed to a container orchestration system cluster on a cloud structure via execution of the code with respect to the definition file. The deployment may include:

1. Attaching a sidecar container to a main application container of the container orchestration system cluster.
2. Reading contents of multiple containers of the container orchestration system cluster.
3. Reading the associated dependencies of the definition file such that the deploying is executed based on results of reading the contents and reading the associated dependencies.

In step 208, a service mesh (of the server) and a machine learning module are installed within the container orchestration system cluster. In step 210, a plurality of proxies is generated via execution of the machine learning module. The plurality of proxies comprise a proxy for each pair of dependencies of the associated dependencies and an associated backup structure. In step 212, network traffic passing through each proxy is monitored via execution of the machine learning module. An initial route set from the microservices to back-end systems comprising the hardware and software systems may be retrieved such that the monitoring is executed with respect to the initial route set.

In step 214, a malfunction of a at least one hardware or software system is detected based on results of step 212. Additionally, hardware and software metrics may be retrieved from the container orchestration system cluster and back-end systems and detecting the malfunction may be further based on analysis of the hardware and software metrics. The hardware and software metrics may include, inter alia, SoR response times, historical SoR outages, historical software and hardware load conditions, microservice throughput, container latency, hardware and software maintenance schedules, worker node and pod failures, etc.

In step 216, an associated network route passing through an associated proxy is disabled in response to results of step 214. Disabling the associated network route may include enabling a circuit breaker component of the service mesh. Alternatively, disabling the associated network route may include updating each proxy to point to back-end systems defined in the definition files.

In step 218, repair of the malfunction is enabled. In step 220, the associated network route passing through the associated proxy is enabled. The aforementioned process may be repeated and the machine learning module may be updated accordingly.

Figure 3:
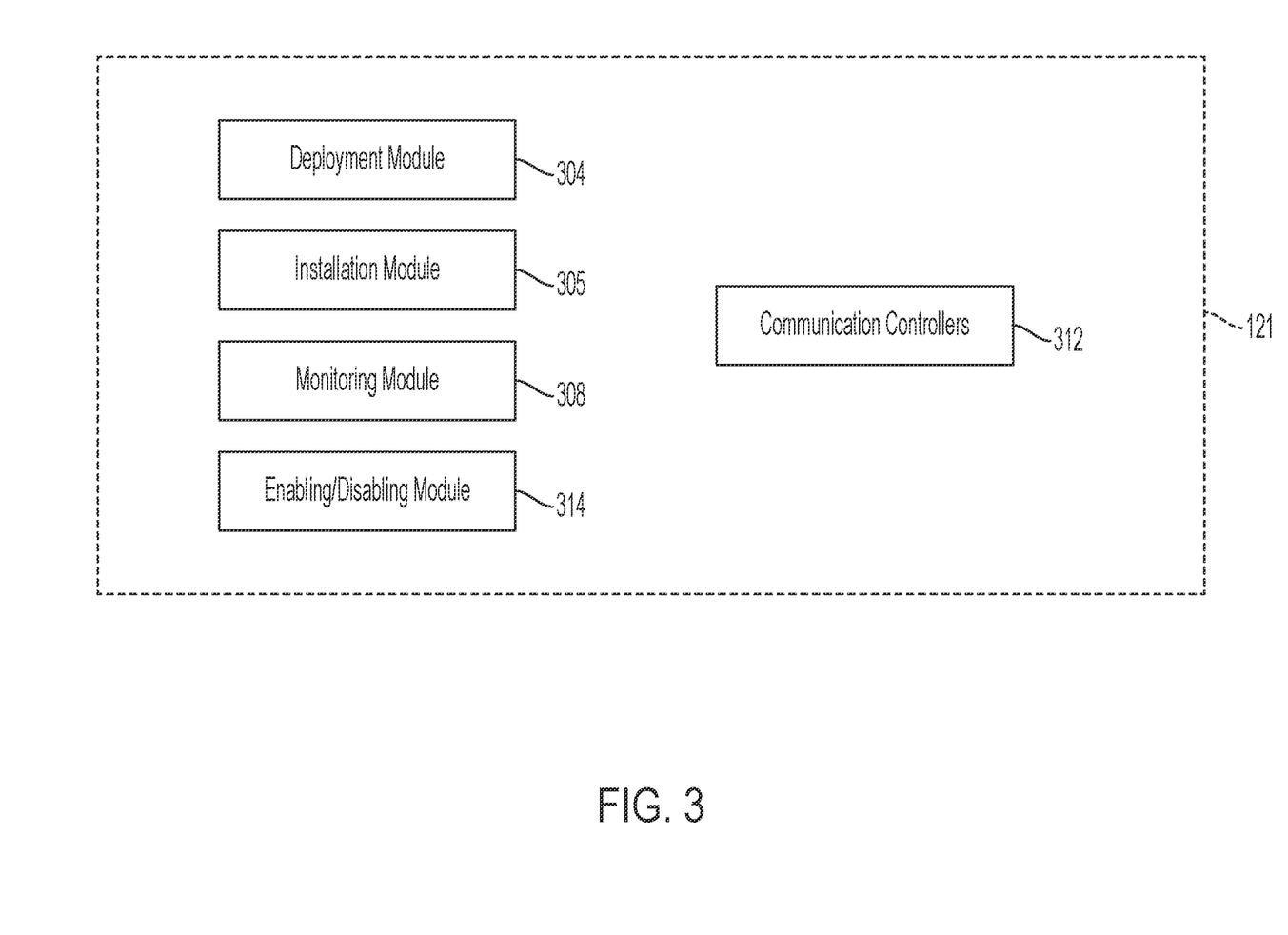
FIG. 3 illustrates an internal structural view of the software/hardware of FIG. 1, in accordance with embodiments of the present invention.

FIG. 3 illustrates an internal structural view of software/hardware 121 (i.e., 121) of FIG. 1, in accordance with embodiments of the present invention. Software/hardware 121 includes a deployment module 304, an installation module 305, a monitoring module 308, an enabling/disabling module 314, and communication controllers 312. Deployment module 304 comprises specialized hardware and software for controlling all functions related to the deployment steps of FIG. 2. Installation module 305 comprises specialized hardware and software for controlling all functionality related to the service mesh installation steps described with respect to the algorithm of FIG. 2. Monitoring module 308 comprises specialized hardware and software for controlling all functions related to the monitoring steps of FIG. 2. Enabling/disabling module 314 comprises specialized hardware and software for controlling all functions related to the network route enabling and disabling steps of the algorithm of FIG. 2. Communication controllers 312 are enabled for controlling all communications between deployment module 304, installation module 305, monitoring module 308, and enabling/disabling module 314.

Figure 4:
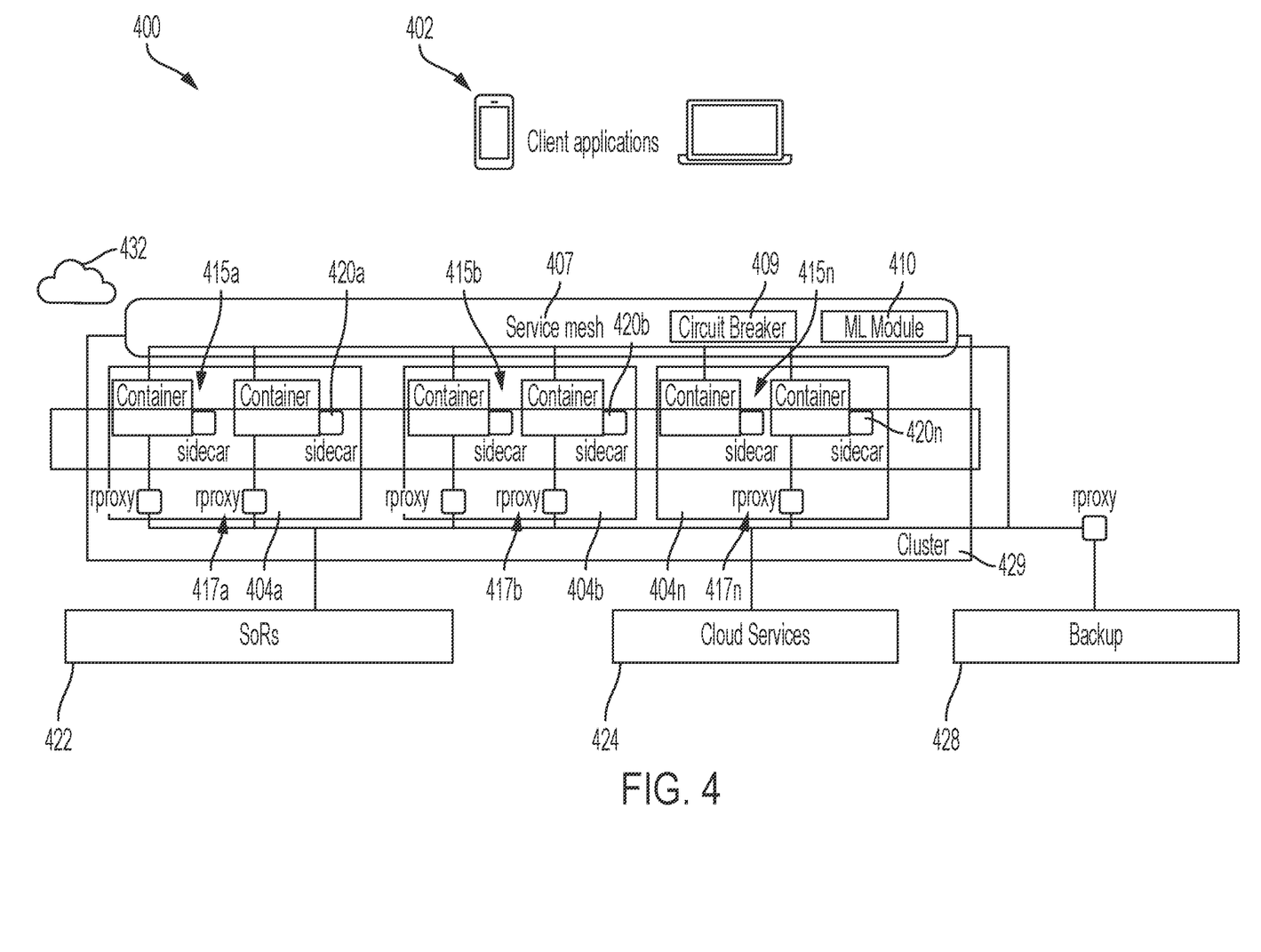
FIG. 4 illustrates a service mesh system enabled via the system of FIG. 1, in accordance with embodiments of the present invention.

FIG. 4 illustrates a service mesh system 400 enabled via system 100 of FIG. 1, in accordance with embodiments of the present invention. Service mesh system 400 comprises client applications 402, a service mesh component 407, container systems 404a . . . 404n, a circuit breaker component 409, an ML module 410, SoR components 422, cloud services 424, a cluster 429, and backup systems 428. Service mesh component 407 comprises a network of deployed services comprising with load balancing components, service-to-service authentication components, and monitoring components operating without requiring any changes to associated service code. Container systems 404a . . . 404n comprise applications packaged with dependent libraries, binaries, and configuration code required to run the applications. Container systems 404a . . . 404n are deployed on an operating system being shared by additional container systems. Container systems 404a . . . 404n comprise containers 415a . . . 415n, sidecar components 420a . . . 420n and proxies 417a . . . 417n. Sidecar components 420a . . . 420n comprise auxiliary service(s) packaged together with a primary service. A sidecar pattern is configured to decouple main logic from supplementary tasks associated with original functionality. Proxies 417a . . . 417n are used for communication with external dependencies (e.g., SoRs, Cloud Services, etc.). Cluster 429 comprises an open-source system for automating deployment, scaling, and management of containerized applications. Circuit breaker component(s) 409 comprises software and hardware for disabling (via connection interruption) routing requests from a client to services that are detected to be at fault or not responding to commands. ML module 410 comprises a machine learning module that enables decision making capability with respect to a next action. SoR components 422 comprise system of records components on-premises or on-cloud (e.g., cloud 432). Cloud services 424 comprise public cloud services for databases, application servers, storage, etc. Backup systems 428 comprise backup servers for storing all backup information for operation of service mesh system 400.

Figure 5:
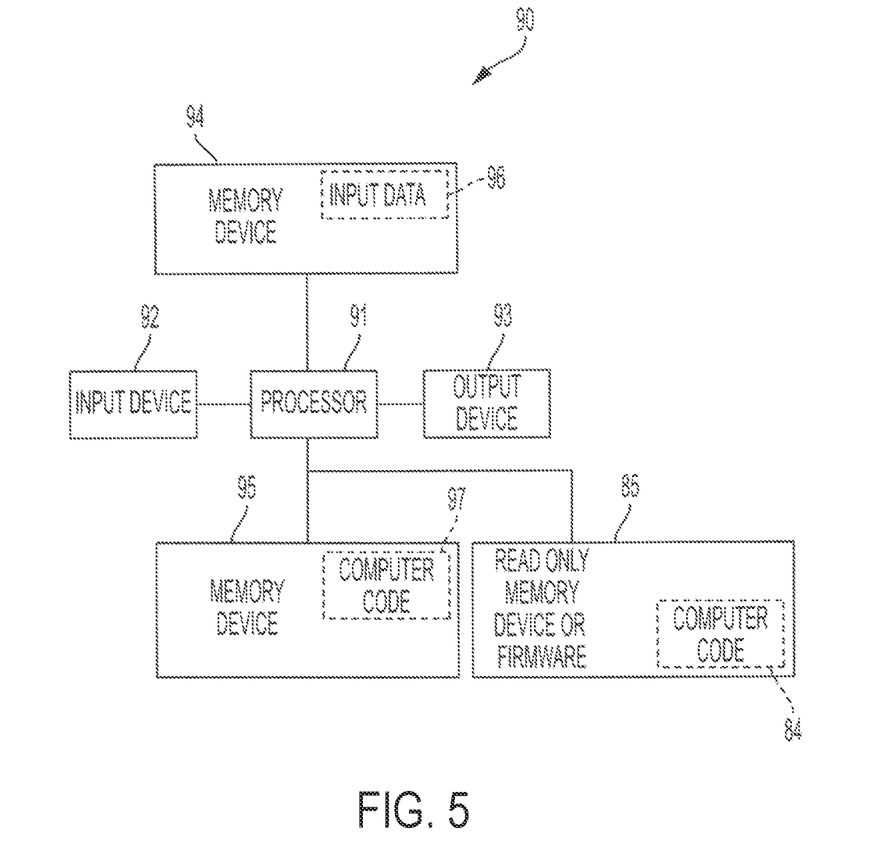
FIG. 5 illustrates a computer system used by the system of FIG. 1 for improving software container cluster technology associated with defining microservices related to implementing hardware and software solutions with respect to hardware and software systems; deploying the microservices to a container orchestration system cluster within a cloud; monitoring network traffic passing through a proxy; detecting a malfunction of a hardware or software system; and disabling an associated network route passing through the proxy, in accordance with embodiments of the present invention.

FIG. 5 illustrates a computer system 90 (e.g., server 139, container system cluster 133, and hardware/software systems 115 of FIG. 1) used by or comprised by the system 100 of FIG. 1 for improving software container cluster technology associated with defining microservices related to implementing hardware and software solutions with respect to hardware and software systems; deploying the microservices to a container orchestration system cluster within a cloud; monitoring network traffic passing through a proxy; detecting a malfunction of a hardware or software system; and disabling an associated network route passing through the proxy, in accordance with embodiments of the present invention.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, spark, R language, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 5 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 2) for improving software container cluster technology associated with defining microservices related to implementing hardware and software solutions with respect to hardware and software systems; deploying the microservices to a container orchestration system cluster within a cloud; monitoring network traffic passing through a proxy; detecting a malfunction of a hardware or software system; and disabling an associated network route passing through the proxy. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 85) may include algorithms (e.g., the algorithm of FIG. 2) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as a Read-Only Memory (ROM) device 85, or may be accessed by processor 91 directly from such a static, nonremovable, read-only medium. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve software container cluster technology associated with defining microservices related to implementing hardware and software solutions with respect to hardware and software systems; deploying the microservices to a container orchestration system cluster within a cloud; monitoring network traffic passing through a proxy; detecting a malfunction of a hardware or software system; and disabling an associated network route passing through the proxy. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving software container cluster technology associated with defining microservices related to implementing hardware and software solutions with respect to hardware and software systems; deploying the microservices to a container orchestration system cluster within a cloud; monitoring network traffic passing through a proxy; detecting a malfunction of a hardware or software system; and disabling an associated network route passing through the proxy. In another embodiment, the invention provides a business method that performs the process steps of the invention on a subscription, advertising, and/or fee basis. That is, a service supplier, such as a Solution Integrator, could offer to enable a process for improving software container cluster technology associated with defining microservices related to implementing hardware and software solutions with respect to hardware and software systems; deploying the microservices to a container orchestration system cluster within a cloud; monitoring network traffic passing through a proxy; detecting a malfunction of a hardware or software system; and disabling an associated network route passing through the proxy. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 5 shows the computer system 90 as a particular configuration of hardware and software, any configuration of hardware and software, as would be known to a person of ordinary skill in the art, may be utilized for the purposes stated supra in conjunction with the particular computer system 90 of FIG. 5. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
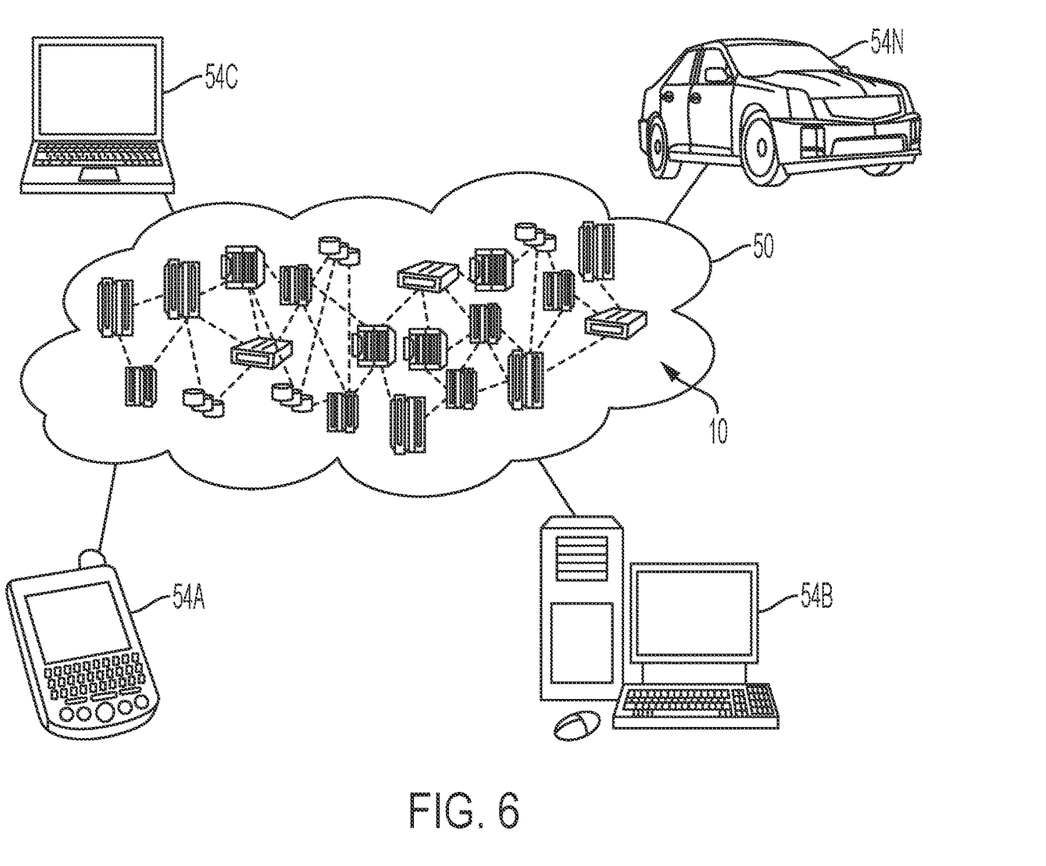
FIG. 6 illustrates a cloud computing environment, in accordance with embodiments of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 12 are intended to be illustrative only and that computing nodes 10 and cloud computing environment 50 can communicate with any type of computerized device over any type of network and/or network addressable connection (e.g., using a web browser).

Figure 7:
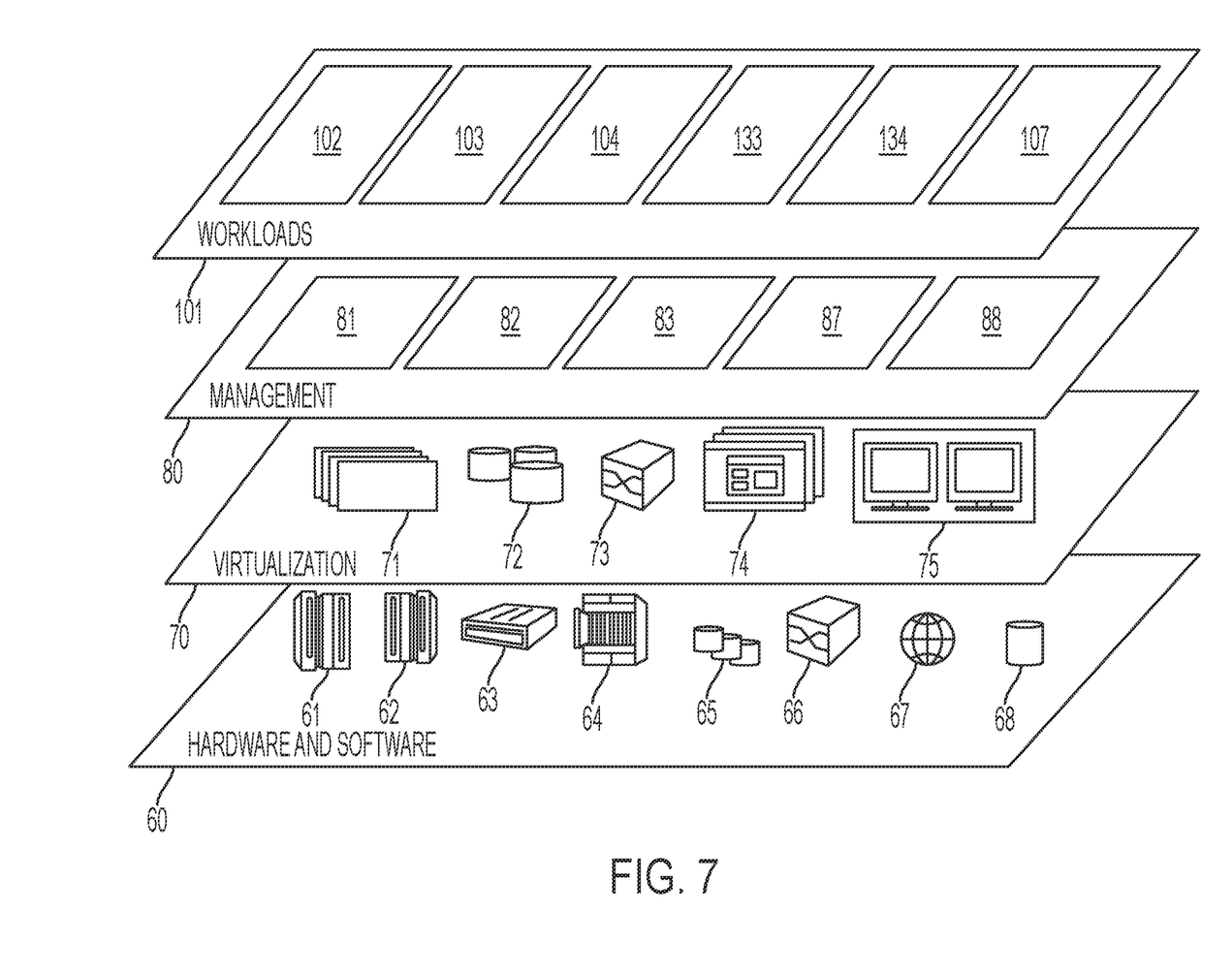
FIG. 7 illustrates a set of functional abstraction layers provided by cloud computing environment, in accordance with embodiments of the present invention.

Referring now to FIG. 7, a set of functional abstraction layers provided by cloud computing environment 50 (see FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 87 provides cloud computing resource allocation and management such that required service levels are met. Service Level Agreement (SLA) planning and fulfillment 88 provide pre-arrangement for, and procurement of, cloud computing resources for which a future requirement is anticipated in accordance with an SLA.

Workloads layer 101 provides examples of functionality for which the cloud computing environment may be utilized. Examples of workloads and functions which may be provided from this layer include: mapping and navigation 102; software development and lifecycle management 103; virtual classroom education delivery 133; data analytics processing 134; transaction processing 106; and for improving software container cluster technology associated with defining microservices related to implementing hardware and software solutions with respect to hardware and software systems; deploying the microservices to a container orchestration system cluster within a cloud; monitoring network traffic passing through a proxy; detecting a malfunction of a hardware or software system; and disabling an associated network route passing through the proxy 107.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A server comprising a processor coupled to a computer-readable memory unit, the memory unit comprising instructions that when executed by the processor implements a microservice deployment method, said method comprising:
  performing a process, said process comprising:
    receiving, by said processor, definitions associated with microservices related to implementing hardware and software solutions with respect to hardware and software systems;
    generating, by said processor, a definition file and associated code comprising said definitions and associated dependencies associated with said microservices;
    deploying, by said processor executing said code with respect to said definition file, said microservices to a container orchestration system cluster on a cloud structure;
    installing, by said processor, a service mesh of said server and a machine learning module within said container orchestration system cluster,
    generating, by said processor executing said machine learning module, a plurality of proxies comprising a proxy for each pair of dependencies of said associated dependencies and an associated backup structure;

monitoring, by said processor executing said machine learning module, network traffic passing through each said proxy;
detecting, by said processor based on results of said monitoring, a malfunction of at least one hardware or software system of said software hardware and software systems; and
disabling, by said processor in response to results of said detecting, an associated network route passing through an associated proxy of said plurality of proxies;
repeating, by said processor, said performing the process; and
updating, by said processor based on results of said repeating, said machine learning module.

2. The server of claim 1, wherein said method further comprises:
enabling, by said processor, a repair of said malfunction; and
enabling, by said processor, said associated network route passing through said associated proxy.

3. The server of claim 1, wherein said method further comprises:
attaching, by said processor, a sidecar container to a main application container of said container orchestration system cluster;
reading, by said processor, contents of multiple containers of said container orchestration system cluster; and
reading, by said processor, said associated dependencies of said definition file, wherein said deploying is executed based on results of said reading said contents and said reading said associated dependencies.

4. The server of claim 1, wherein said method further comprises:
retaining, by said processor executing said machine learning module, an initial route set from said microservices to back-end systems comprising said hardware and software systems, wherein said monitoring is executed with respect to said initial route set.

5. The server of claim 4, wherein said method further comprises:
retrieving, by said processor during said monitoring, hardware and software metrics from said container orchestration system cluster and said back-end systems, wherein said detecting said malfunction is further based on analysis of said hardware and software metrics.

6. The server of claim 5, wherein said hardware and software metrics comprise metrics selected from the group consisting of system of record (SoR) response times, historical SoR outages, historical software and hardware load conditions, microservice throughput, container latency, hardware and software maintenance schedules, and worker node and pod failures.

7. The server of claim 1, wherein said disabling said associated network route comprises enabling a circuit breaker component of said service mesh.

8. The server of claim 1, wherein said disabling said associated network route comprises updating each said proxy to point to back-end systems defined in said definition files.

9. A microservice deployment method, said method comprising:
performing a process, said process comprising:
receiving, by a processor of a server, definitions associated with microservices related to implementing hardware and software solutions with respect to hardware and software systems;
generating, by said processor, a definition file and associated code comprising said definitions and associated dependencies associated with said microservices;
deploying, by said processor executing said code with respect to said definition file, said microservices to a container orchestration system cluster on a cloud structure;
installing, by said processor, a service mesh of said server and a machine learning module within said container orchestration system cluster;
generating, by said processor executing said machine learning module, a plurality of proxies comprising a proxy for each pair of dependencies of said associated dependencies and an associated backup structure;
monitoring, by said processor executing said machine learning module, network traffic passing through each said proxy;
detecting, by said processor based on results of said monitoring, a malfunction of at least one hardware or software system of said software hardware and software systems; and
disabling, by said processor in response to results of said detecting, an associated network route passing through an associated proxy of said plurality of proxies;
repeating by said processor, said performing the process; and
updating, by said processor based on results of said repeating, said machine learning module.

10. The method of claim 9, further comprising:
enabling, by said processor, a repair of said malfunction; and
enabling, by said processor, said associated network route passing through said associated proxy.

11. The method of claim 9, further comprising:
attaching, by said processor, a sidecar container to a main application container of said container orchestration system cluster;
reading, by said processor, contents of multiple containers of said container orchestration system cluster; and
reading, by said processor, said associated dependencies of said definition file, wherein said deploying is executed based on results of said reading said contents and said reading said associated dependencies.

12. The method of claim 9, further comprising:
retaining, by said processor executing said machine learning module, an initial route set from said microservices to back-end systems comprising said hardware and software systems, wherein said monitoring is executed with respect to said initial route set.

13. The method of claim 12, further comprising:
retrieving, by said processor during said monitoring, hardware and software metrics from said container orchestration system cluster and said back-end systems, wherein said detecting said malfunction is further based on analysis of said hardware and software metrics.

14. The method of claim 13, wherein said hardware and software metrics comprise metrics selected from the group consisting of system of record (SoR) response times, historical SoR outages, historical software and hardware load conditions, microservice throughput, container latency, hardware and software maintenance schedules, and worker node and pod failures.

15. The method of claim 9, wherein said disabling said associated network route comprises enabling a circuit breaker component of said service mesh.

16. The method of claim 9, wherein said disabling said associated network route comprises updating each said proxy to point to back-end systems defined in said definition files.

17. The method of claim 9, further comprising:
providing at least one support service for at least one of creating, integrating, hosting, maintaining, and deploying computer-readable code in the server, said code being executed by the processor to implement: said receiving, said generating said definition file, said deploying, said installing, said generating said plurality of proxies, said monitoring, said detecting, and said disabling.

18. A computer program product, comprising a computer readable hardware storage device storing a computer readable program code, said computer readable program code comprising an algorithm that when executed by a processor of a server implements a microservice deployment method, said method comprising:
performing a process, said process comprising:
receiving, by said processor of a server, definitions associated with microservices related to implementing hardware and software solutions with respect to hardware and software systems;
generating, by said processor, a definition file and associated code comprising said definitions and associated dependencies associated with said microservices;
deploying, by said processor executing said code with respect to said definition file, said microservices to a container orchestration system cluster on a cloud structure;
installing, by said processor, a service mesh of said server and a machine learning module within said container orchestration system cluster;
generating, by said processor executing said machine learning module, a plurality of proxies comprising a proxy for each pair of dependencies of said associated dependencies and an associated backup structure;
monitoring, by said processor executing said machine learning module, network traffic passing through each said proxy;
detecting, by said processor based on results of said monitoring, a malfunction of at least one hardware or software system of said software hardware and software systems; and
disabling, by said processor in response to results of said detecting, an associated network route passing through an associated proxy of said plurality of proxies;
repeating by said processor, said performing the process; and
updating, by said processor based on results of said repeating, said machine learning module.

\* \* \* \* \*